(12) United States Patent
Annoura

(10) Patent No.: US 8,161,954 B2
(45) Date of Patent: Apr. 24, 2012

(54) FUEL SUPPLY CONTROL APPARATUS

(75) Inventor: Toshiki Annoura, Nagoya (JP)

(73) Assignee: Denso Corporation, Kariya (JP)

( * ) Notice: Subject to any disclaimer, the term of this patent is extended or adjusted under 35 U.S.C. 154(b) by 473 days.

(21) Appl. No.: 12/545,960

(22) Filed: Aug. 24, 2009

(65) Prior Publication Data

US 2010/0050982 A1 Mar. 4, 2010

(30) Foreign Application Priority Data

Aug. 27, 2008 (JP) .................................. 2008-218728

(51) Int. Cl.
F02B 13/00 (2006.01)

(52) U.S. Cl. ......... 123/575; 123/304; 123/578; 123/672

(58) Field of Classification Search ................. 123/25 K, 123/304, 672, 674, 685, 686, 703, 575, 576, 123/578

See application file for complete search history.

(56) References Cited

U.S. PATENT DOCUMENTS

| | | | | |
|---|---|---|---|---|
| 4,391,253 A | * | 7/1983 | Ito | ............................ 123/406.44 |
| 4,884,530 A | * | 12/1989 | Boekhaus et al. | ............. 123/1 A |
| 4,957,087 A | * | 9/1990 | Ota | ............................... 123/479 |
| 4,993,386 A | * | 2/1991 | Ozasa et al. | ................. 123/25 J |
| 5,014,670 A | * | 5/1991 | Mitsumoto | .............. 123/406.15 |
| 5,050,561 A | * | 9/1991 | Kashiwabara et al. | ......... 62/133 |
| 5,056,490 A | * | 10/1991 | Kashima | ....................... 123/478 |
| 5,367,264 A | | 11/1994 | Brabetz | |
| 5,881,703 A | * | 3/1999 | Nankee et al. | ................ 123/686 |
| 6,714,856 B2 | * | 3/2004 | Huff et al. | ..................... 701/114 |
| 2003/0070666 A1 | * | 4/2003 | Hosoi | ............. 123/672 |
| 2007/0119425 A1 | * | 5/2007 | Lewis et al. | ................... 123/478 |

FOREIGN PATENT DOCUMENTS

| | | |
|---|---|---|
| JP | 62-178735 | 8/1987 |
| JP | 6-213855 | 8/1994 |
| JP | 2006-322401 | 11/2006 |

\* cited by examiner

*Primary Examiner* — Noah Kamen
*Assistant Examiner* — Hung Q Nguyen
(74) *Attorney, Agent, or Firm* — Nixon & Vanderhye PC

(57) ABSTRACT

A fuel supply control apparatus for an engine includes an alcohol concentration detector and an engine temperature detector. The apparatus increases an amount of fuel supplied to the engine as the detected alcohol concentration becomes higher. The apparatus increases the amount of fuel as the engine temperature becomes lower and as the alcohol concentration becomes higher. The apparatus feed-back corrects the amount of fuel by using a correction value such that an actual air-fuel ratio becomes a theoretical air fuel ratio. The apparatus determines that water is mixed with fuel when the correction value during a cold operational state indicates leaner than the lean value of the correction value used during a warm operational state. The apparatus reduces the increased amount of fuel when water is mixed with fuel.

6 Claims, 8 Drawing Sheets

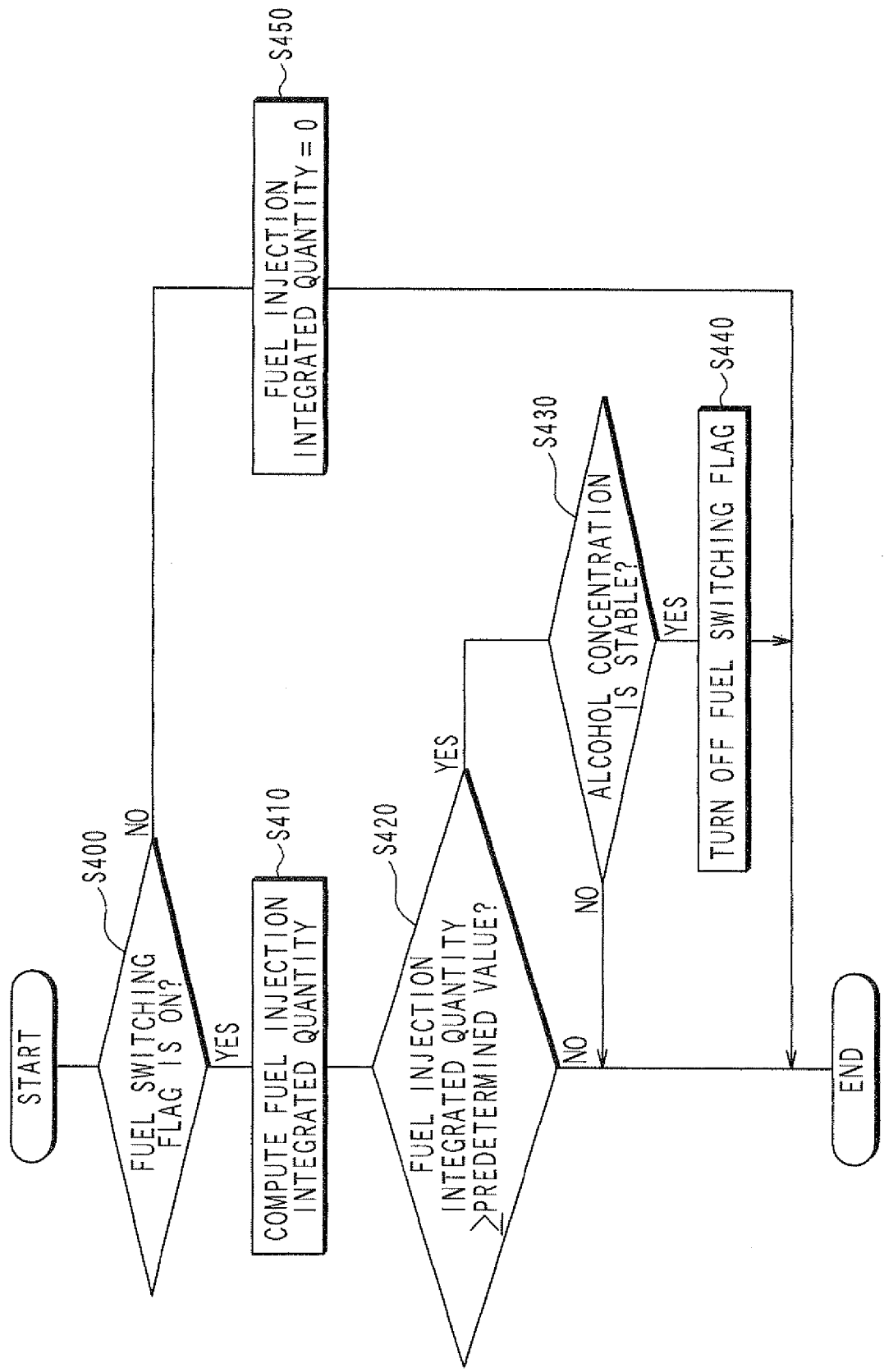

US 8,161,954 B2

FUEL SUPPLY CONTROL APPARATUS

CROSS REFERENCE TO RELATED APPLICATION

This application is based on and incorporates herein by reference Japanese Patent Application No. 2008-218728 filed on Aug. 27, 2008.

BACKGROUND OF THE INVENTION

1. Field of the Invention

The present invention relates to a fuel supply control apparatus for an engine that is capable of using any one of alcohol, gasoline, and alcohol-gasoline mixture as fuel.

2. Description of Related Art

A conventional fuel supply control apparatus for an engine that is capable of using any one of alcohol, gasoline, and mixture of alcohol and gasoline is shown in JP-A-S62-178735, for example. The apparatus in JP-A-S62-178735 detects an alcohol concentration in blended fuel by using a capacitance sensor. As the alcohol concentration in blended fuel becomes higher, or as the coolant temperature of the engine becomes lower, an injection duration of a fuel injection valve is made longer such that an amount of fuel supplied to the engine is increased. As a result, when starting the engine at a low-temperature state, the starting of the engine is reliably executed.

When water is mixed with blended fuel, a capacitance of blended fuel is increased, and thereby the alcohol concentration detected by the capacitance sensor may have an erroneous detection value. Specifically, the alcohol concentration detected by the sensor may become higher than an actual alcohol concentration. As a result, specially when the engine is started during the low temperature state (when the engine is cold-started), fuel may be excessively supplied to the engine. As a result, the fuel consumption is disadvantageously increased, and at the same time, drivability may deteriorate disadvantageously.

It should be noted that a detected alcohol concentration detected by a capacitance sensor is higher than an actual alcohol concentration when water is mixed with blended fuel disadvantageously. Also, for example, a detected alcohol concentration detected by a known optical type sensor is higher than the actual alcohol concentration when water is mixed with blended fuel disadvantageously.

SUMMARY OF THE INVENTION

The present invention is made in view of the above disadvantages. Thus, it is an objective of the present invention to address at least one of the above disadvantages.

To achieve the objective of the present invention, there is provided a fuel supply control apparatus for an engine that is capable of using alcohol, gasoline and alcohol-gasoline mixture as fuel, the fuel supply control apparatus including an alcohol concentration detector, an engine temperature detector, first increase correction means, second increase correction means, air-fuel ratio feed-back correction means, and water mixture correction means. The alcohol concentration detector is adapted to detect alcohol concentration of fuel. The engine temperature detector is adapted to detect engine temperature. The first increase correction means corrects an amount of fuel supplied to the engine such that the amount of fuel is increased as the detected alcohol concentration becomes higher. The second increase correction means corrects the amount of fuel supplied to the engine such that the amount of fuel is increased as the detected engine temperature becomes lower and also as the detected alcohol concentration becomes higher. The air-fuel ratio feed-back correction means feed-back corrects the amount of fuel supplied to the engine by using a feed-back correction value such that an actual air-fuel ratio of the engine becomes closer to a theoretical air fuel ratio. When the actual air-fuel ratio is lower than the theoretical air fuel ratio, the feed-back correction value indicates a lean value that corresponds to an amount, which is used to reduce the amount of fuel supplied to the engine such that the actual air-fuel ratio is increased to the theoretical air fuel ratio. The water mixture correction means determines that water is mixed with fuel when the feed-back correction value used during a cold operational state of the engine indicates the lean value greater than the lean value of the feed-back correction value used during a warm operational state of the engine. The water mixture correction means reduces the increased amount of fuel, which is increased based on the detected alcohol concentration, when the water mixture correction means determines that water is mixed with fuel.

BRIEF DESCRIPTION OF THE DRAWINGS

The invention, together with additional objectives, features and advantages thereof, will be best understood from the following description, the appended claims and the accompanying drawings in which.

FIG. 10 is a flow chart illustrating a process for determining whether a condition for turning off the fuel switching flag is satisfied.

DETAILED DESCRIPTION OF EMBODIMENTS

Figure 1:
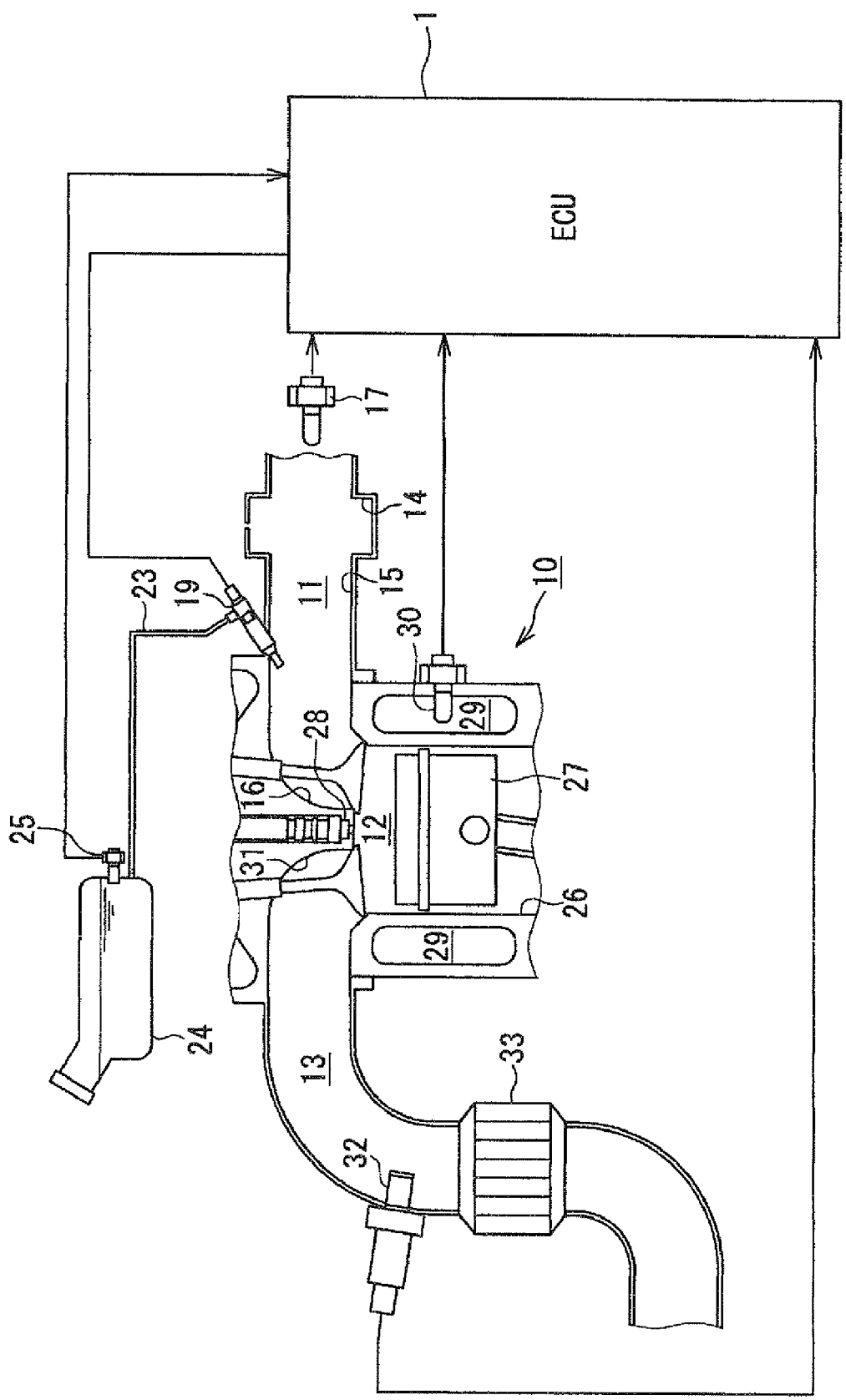
FIG. 1 is a diagram illustrating a general schematic configuration of an engine control system including a fuel supply control apparatus according to the embodiment.

Embodiments of the present invention will be described with reference to accompanying drawings. FIG. 1 is a diagram illustrating a general schematic configuration of an engine control system that includes a fuel supply control apparatus according to the present embodiment. It should be noted that an engine 10 shown in FIG. 1 is an engine for FFV (Flexible Fuel Vehicle), that is capable of using any one of alcohol, gasoline, and alcohol-gasoline mixture as fuel. In other words, the engine for FFV is capable of using each of alcohol and gasoline individually as fuel, and is also capable of using the mixture of alcohol and gasoline. Also, the engine 10 of FIG. 1 illustrates an intake port injection engine, in which fuel is injected into an intake port 16 of an intake passage 11. However, the engine may be a gasoline direct injection engine, in which fuel is injected into a combustion chamber 12, or the engine may be a dual injection engine having both of an injector for intake port injection and an injector for direct injection.

As shown in FIG. 1 the engine 10 includes the intake passage 11, the combustion chamber 12, and an exhaust passage 13. Air is introduced from exterior and passes through the intake passage 11. Air-fuel mixture, which has the above introduced air mixed with blended fuel, is fed for combustion in the combustion chamber 12. Exhaust gas generated by the combustion in the combustion chamber 12 is discharged through the exhaust passage 13.

The intake passage 11 is branched into multiple passages for cylinders at an intake manifold 15 located downstream of a surge tank 14, and is connected with the combustion chamber 12 of each of the cylinders through the intake port 16. The intake passage 11 is provided with an intake air sensor 17 located upstream of the surge tank 14 for detecting temperature of air in the intake passage 11. Also, the intake passage 11 is provided with injectors 19, each of which injects blended fuel, and each of which is provided for the intake port 16 of each of the cylinder. Furthermore, the intake passage 11 is provided with air flow meters (not shown) for detecting air amounts suctioned into the corresponding intake ports 16.

The injector 19 is connected with a fuel tank 24 through a fuel passage 23, and the injector 19 is supplied with blended fuel in the fuel tank 24 that is pumped by a fuel pump (not shown). It should be noted that the fuel tank 24 is provided with an alcohol concentration sensor 25. The alcohol concentration sensor 25 has a known configuration, and, for example, detects capacitance of blended fuel in the fuel tank 24 such that an alcohol concentration (ratio of alcohol in blended fuel) of blended fuel is obtained. Alternatively, instead of the capacitance sensor, the alcohol concentration sensor 25 may employ a known optical type sensor that, for example, detects a change of a quantity of light that passes through fuel such that alcohol concentration is obtained.

The combustion chamber 12 of the engine 10 is defined by a wall of a cylinder 26 and an upper surface of a piston 27 that is displaceably provided within the cylinder 26. The combustion chamber 12 has an upper surface that is provided with an ignition plug 28 adapted to ignite the introduced air-fuel mixture by spark. Also, the wall of the cylinder 26 is provided with a water jacket 29 that is a flow channel of coolant for cooling the engine. The water jacket 29 is provided with a coolant temperature sensor 30 that detects temperature of the coolant flowing inside the water jacket 29.

The exhaust passage 13 is connected with the combustion chamber 12 through an exhaust port 31. The exhaust passage 13 is provided with an air-fuel ratio sensor 32 that detects an air-fuel ratio of air-fuel mixture supplied for combustion in the combustion chamber 12. More specifically, the air-fuel ratio sensor 32 detects the air-fuel ratio based on an oxygen content in exhaust gas that flows inside the exhaust passage 13. Also, the exhaust passage 13 is provided with a catalytic converter 33 located downstream of the air-fuel ratio sensor 32 for purifying exhaust gas.

It should be noted that the engine 10 is provided with another sensor, such as a crank angle sensor for detecting an engine rotational speed, although the sensor is not shown in the drawings.

An engine control unit (ECU) 1 executes various controls of operating the above engine 10. The ECU 1 basically includes a central processing unit (CPU), a memory, and a drive circuit (not shown). The CPU executes various calculation processes related to the engine control, and the memory stores various programs and data sets used for controlling the CPU. Also, the drive circuit drives the fuel pump (not shown) and the injector 19. Then, the ECU 1 executes a fuel supply control as one of the engine controls by using the injector 19.

As shown in FIG. 1, the ECU 1 is connected with various sensors for detecting an operational state of the engine 10, such as the coolant temperature sensor 30, the air-fuel ratio sensor 32, and executes various processes for controlling the engine based on detection results from the sensors.

Figure 2:
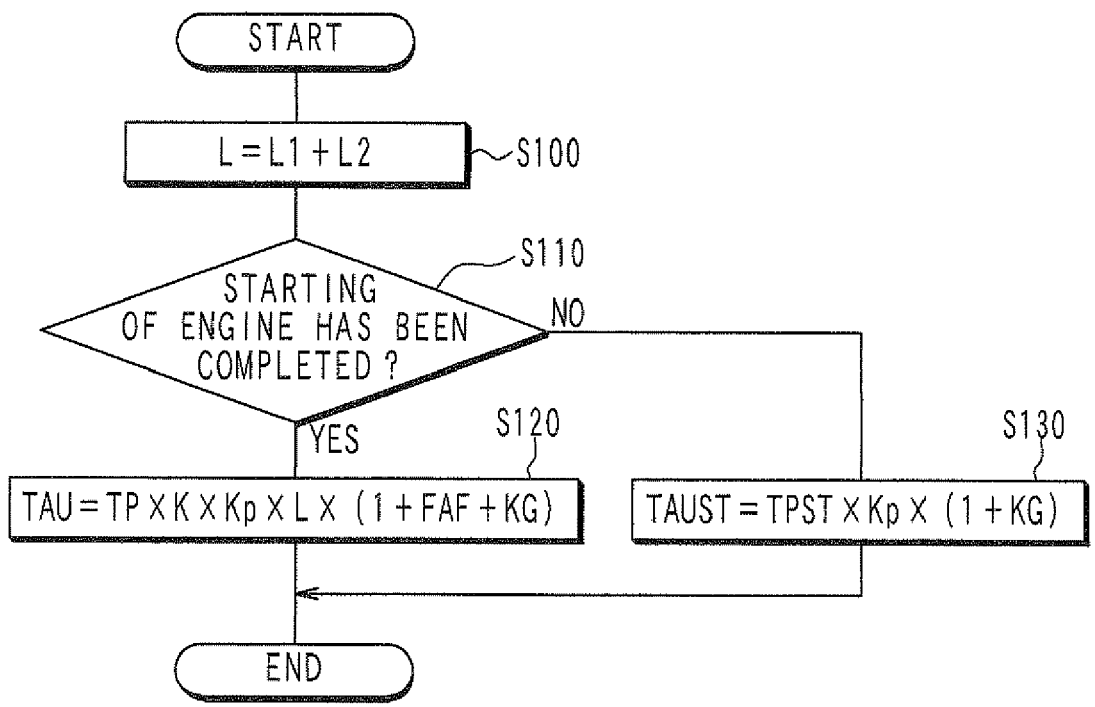
FIG. 2 is a flow chart illustrating a process for Computing a fuel injection quantity by an injector in order to execute a fuel supply control.

Next, the fuel supply control for the engine 10 will be detailed below. FIG. 2 is a flow chart illustrating a process for computing a fuel injection quantity of the injector 19 in order to execute the fuel supply control. It should be noted that the fuel injection quantity is computed as a fuel injection duration TAU, during which the injector 19 injects fuel.

At step S100, an alcohol concentration reflection value L is computed in order to take the alcohol concentration detected by the alcohol concentration sensor 25 into consideration of computing the fuel injection duration TAU. More specifically, the alcohol concentration reflection value L is computed by summing of an increase coefficient L1 and a correction coefficient L2. The increase coefficient L1 is obtained from a sensor output value of the alcohol concentration sensor 25. The correction coefficient L2 is used for correcting the alcohol concentration reflection value L by canceling an increase amount of the increase coefficient L1 when the increase coefficient L1 increases excessively.

Alcohol has a calorific value (heating value) for combustion lower than a calorific value of gasoline, in general. As a result, in order to obtain the engine output from blended fuel, which output is equivalent to the engine output of gasoline, it is required to supply more blended fuel to the combustion chamber 12 as the alcohol concentration of blended fuel increases. Therefore, in order to appropriately consider the alcohol concentration of blended fuel, the sensor output value of the alcohol concentration sensor 25 is converted into the increase coefficient L1 based on conversion characteristic diagram shown in FIG. 3. The above correction using the increase coefficient L1 corresponds to first increase correction means.

Figure 3:
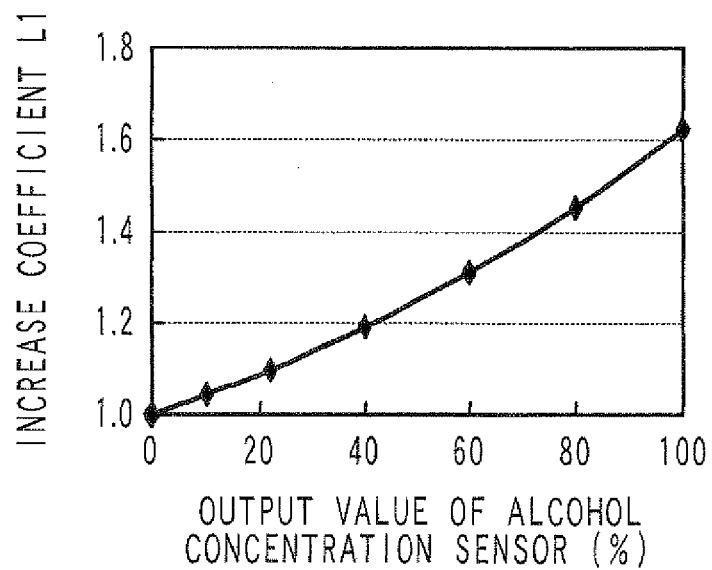
FIG. 3 is a conversion characteristic diagram used for converting a sensor output value from an alcohol concentration sensor into an increase coefficient L1.

In the conversion characteristic diagram shown in FIG. 3, for example, blended fuel having the alcohol concentration of "100%" indicates the blended fuel that is made by mixture ratio between alcohol of "100%" and gasoline of "0%". For the above blended fuel having the alcohol concentration of "100%", the increase coefficient L1 is about "1.65". The increase coefficient L1 of "1.65" is computed by dividing the theoretical air fuel ratio "14.7" for an operational case of using gasoline-100% fuel by a theoretical air fuel ratio "8.9" for another operational case of using alcohol-100% fuel. Also, for example, blended fuel having alcohol concentration of "0%" indicates blended fuel that is made by a mixture ratio between alcohol of "0%" and gasoline of "100%", and thereby the increase coefficient L1 is computed as "1.0" based on the diagram of FIG. 3.

As above, the increase coefficient L1 is computed in accordance with the sensor output value of the alcohol concentration sensor 25, and a basic injection quantity TP is multiplied by the computed increase coefficient L1 (more specifically, the alcohol concentration reflection value L as described later). As a result, even when the alcohol concentration of blended fuel changes, the blended fuel of the changed concentration is capable of producing a desired engine output, which corresponds to an engine output obtainable by the injection of blended fuel (gasoline of 100%) of the basic injection quantity TP.

At step S110, for example, it is determined whether starting of the engine 10 has not been completed or the starting of the engine 10 has been completed based on the engine rotational speed. For example, when the engine rotational speed is less than 500 rpm, it is determined that the starting of the engine 10 has not been completed, and control proceeds to step S130. At step S130, a start-up injection duration TAUST is computed using an equation that is different from an equation used for computing a start-completion injection duration TAU such that the engine 10 is appropriately started.

The start-up injection duration TAUST is computed through multiplying a start-up basic injection quantity TPST by a fuel pressure correction coefficient Kp and also by a value made by summing of an air-fuel ratio learning value KG and 1 as shown at step S130 in FIG. 2. The start-up the basic injection quantity TPST is computed as a function of the alcohol concentration reflection value L and the coolant temperature, and is computed to be a greater value as the alcohol concentration reflection value L becomes greater and as the coolant temperature becomes lower. The fuel pressure correction coefficient Kp is determined in accordance with pressure of fuel supplied from the fuel tank 24 to the injector 19. The air-fuel ratio learning value KG will be described later. In short, when a feed-back correction value FAF, which is used for air-fuel ratio feed-back correction, is different from the standard value, which corresponds to the theoretical air fuel ratio, during the execution of the air-fuel ratio feed-back control, the air-fuel ratio learning value KG is computed to compensate the difference between the feed-back correction value FAF and the standard value. Because the start-up injection duration TAUST is computed as above, it is possible to supply the engine 10 with fuel of an appropriate amount, which is required for starting the engine 10, regardless of engine start-up temperature and regardless of the alcohol concentration of blended fuel.

In contrast, when it is determined at step S110 that the engine rotational speed is equal to or greater than 500 rpm, and thereby it is determined that the starting of the engine 10 has been completed, control proceeds to step S120. At step S120, the start-completion injection duration TAU is computed through multiplying the basic injection quantity TP by a cold-state increase coefficient K, the fuel pressure correction coefficient Kp, the alcohol concentration reflection value L, and a value, which is made by summing of the air-fuel ratio feed-back correction value FAF, the air-fuel ratio learning value KG and 1 as shown in an equation at step S120 in FIG. 2.

The basic injection quantity TP is computed based on an intake air amount Qa and an engine rotational speed Ne of the engine 10 such that the air-fuel ratio becomes the theoretical air fuel ratio. For example, the basic injection quantity TP is computed by an equation of "basic injection quantity TP=constant k×intake air amount Qa/engine rotational speed Ne". It should be noted that the above computation method for computing the basic injection quantity TP is merely one example, and thereby it is possible to compute the basic injection quantity TP by a known computation method other than the above computation method.

Figure 4:
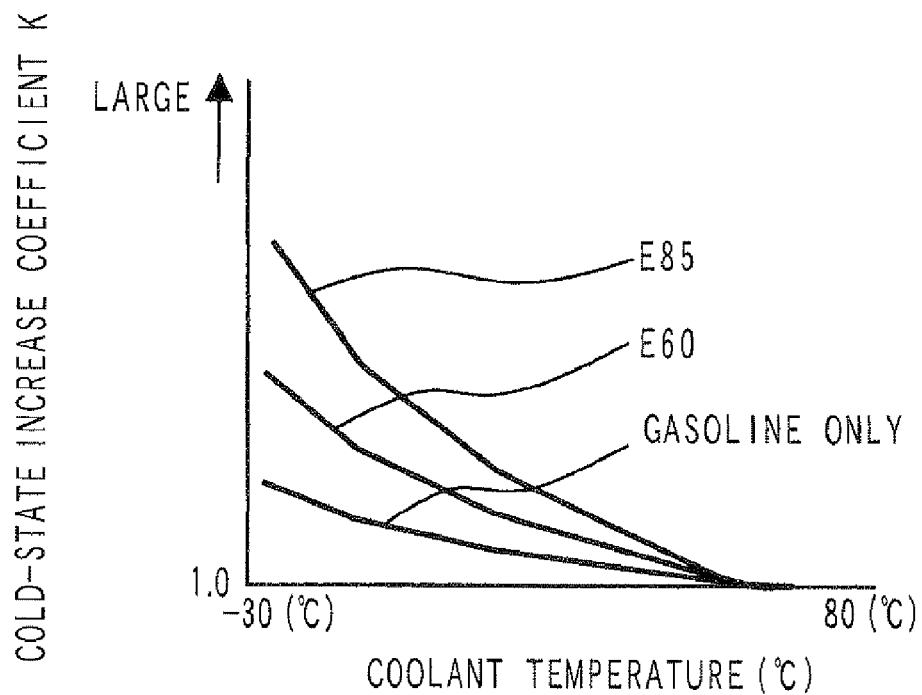
FIG. 4 is a characteristic diagram illustrating a relation between coolant temperature and a cold-state increase coefficient K.

In general, the decrease of coolant temperature of the engine 10 deteriorates the evaporation performance of fuel. Thus, the cold-state increase coefficient K is used for correcting the basic injection quantity TP such that the basic injection quantity TP is increased as coolant temperature decreases. The cold-state increase coefficient K, as shown in FIG. 4, becomes greater as the alcohol concentration of blended fuel becomes higher even under the same coolant temperature. The cold-state increase coefficient K is designed as above because the alcohol is less likely to evaporate than gasoline. It should be noted that in FIG. 4, E60 and E85 indicate the alcohol concentration of fuel, and more specifically, E60 indicates the alcohol concentration of 60%, and E85 indicates the alcohol concentration of 85%. The above correction using the cold-state increase coefficient K corresponds to second increase correction means.

The basic injection quantity TP is multiplied by the alcohol concentration reflection value L because of the following reason. The basic injection quantity TP is computed under an assumed case, where blended fuel having the alcohol concentration of 0% is injected. In other words, the basic injection quantity TP is computed for a case, where blended fuel having the gasoline concentration of 100%. In a usual operation, blended fuel fed to the fuel tank 24 may have a different alcohol concentration other than the alcohol concentration of 0%, and thereby when the blended fuel of the above different alcohol concentration is supplied by the basic injection quantity TP, it is impossible to obtain a desired operational state. Thus, the basic injection quantity TP is corrected by the alcohol concentration reflection value L (the increase coefficient L1) in accordance with the alcohol concentration of blended fuel.

The basic injection quantity TP is further multiplied by a value (FAF+KG+1) that is a sum of the air-fuel ratio feed-back correction value FAF, the air-fuel ratio learning value KG, and 1. In other words, after the starting of the engine 10 has been completed, basically, the air-fuel ratio feed-back control is executed, and at the same time, the injection duration TAU is computed based on the air-fuel ratio feed-back correction value FAF of the air-fuel ratio feed-back control. It should be noted that the air-fuel ratio feed-back correction value FAF is determined based on the sensor output value of the air-fuel ratio sensor 32 such that the air-fuel ratio of air-fuel mixture, which is made by (a) air introduced through the intake passage 11 and (b) supplied blended fuel, becomes a desired value (theoretical air fuel ratio). The above correction using the air-fuel ratio feed-back correction value FAF corresponds to air-fuel ratio feed-back correction means.

However, the air-fuel ratio feed-back correction value FAF may become different from the standard value that corresponds to the theoretical air fuel ratio due to the aging of components of the engine 10 and variation of the components even when the air-fuel ratio feed-back correction value FAF is computed for causing the actual air-fuel ratio to become the theoretical air fuel ratio. In the above case, in order to compensate the steady difference of the air-fuel ratio feed-back correction value FAF, the air-fuel ratio learning value KG is computed.

It should be noted that the air-fuel ratio feed-back control is executed when a predetermined air-fuel ratio feed-back condition is satisfied. Specifically, for example, the air-fuel ratio feed-back control is executed when all of the following four conditions are satisfied. (1) The current operation is different from a fuel cutting operation, where supply of blended fuel to the combustion chamber 12 is temporarily stopped. (2) The current operation is different from a high load operation, where an amount of blended fuel supplied to the combustion chamber 12 is temporarily increased. (3) The coolant temperature of the engine 10 is equal to or higher than zero. (4) The air-fuel ratio sensor 32 is appropriately activated.

Also, the air-fuel ratio learning value KG is computed under an operational state, for example, where the variation of the operational load of the engine 10 is small, when the feed-back correction value FAF remains constantly different from the standard value for a predetermined period. Thus-computed air-fuel ratio learning value KG is stored in the memory of the ECU 1, and is used for computing the injection duration TAU and the start-up injection duration TAUST.

When the above air-fuel ratio feed-back condition is satisfied, the ECU 1 operates the fuel pump (not shown) and operates the injector 19 only during the injection duration TAU such that blended fuel is injected by an amount in accordance with the injection duration TAU. As a result, the engine 10 basically executes the air-fuel ratio feed-back control during the operation of the engine 10 after the completion of the starting of the engine 10. The sensor output value of the air-fuel ratio sensor 32 continuously varies between a slightly richer value or a slightly leaner value around the target air-fuel ratio in accordance with the alcohol concentration of blended fuel stored in the fuel tank 24. Then, the sensor output value of the air-fuel ratio sensor 32 changes stably. It should be noted that when the above air-fuel ratio feed-back condition is not satisfied, the air-fuel ratio feed-back correction value FAF becomes 0, and thereby the injection duration TAU is computed based only on the air-fuel ratio learning value KG.

Next, the correction coefficient L2 will be described below. The correction coefficient L2 is used in the computation of the alcohol concentration reflection value L and corrects the alcohol concentration reflection value L.

Figure 5:
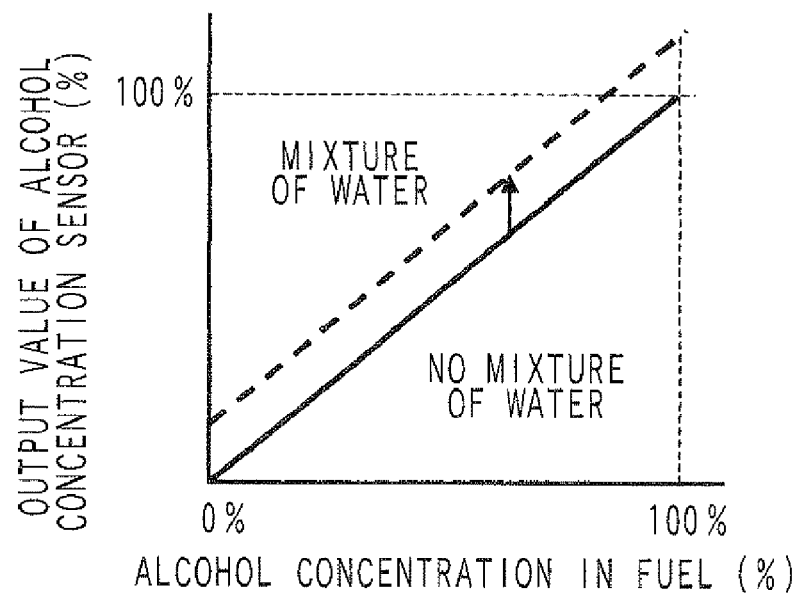
FIG. 5 is an explanatory diagram for explaining that an alcohol concentration detected by the alcohol concentration sensor becomes higher than an actual alcohol concentration when water is mixed with blended fuel.

When water is mixed with blended fuel made by alcohol and gasoline, as shown in FIG. 5, the alcohol concentration detected by the alcohol concentration sensor 25 becomes higher than an actual alcohol concentration.

Also, the above detection error of the alcohol concentration sensor 25 becomes greater when the concentration of water mixed with blended fuel becomes higher.

When the alcohol concentration detected by the alcohol concentration sensor 25 has an error, the increase coefficient L1, which is computed in accordance with the sensor output value of the alcohol concentration sensor 25, also has an error. Specifically, when water is mixed with blended fuel, the alcohol concentration detected by the alcohol concentration sensor 25 becomes higher than the actual alcohol concentration, and as a result, the increase coefficient L1 and the alcohol concentration reflection value L become larger than necessary. Consequently, an excessive amount of fuel is prone to be supplied to the engine 10.

When water is mixed with blended fuel, the increase coefficient L1 becomes greater than necessary as above. In this case, the correction coefficient L2 functions to offset the above excessive increase amount of the increase coefficient L1 such that the alcohol concentration reflection value L becomes appropriately smaller.

Figure 6:
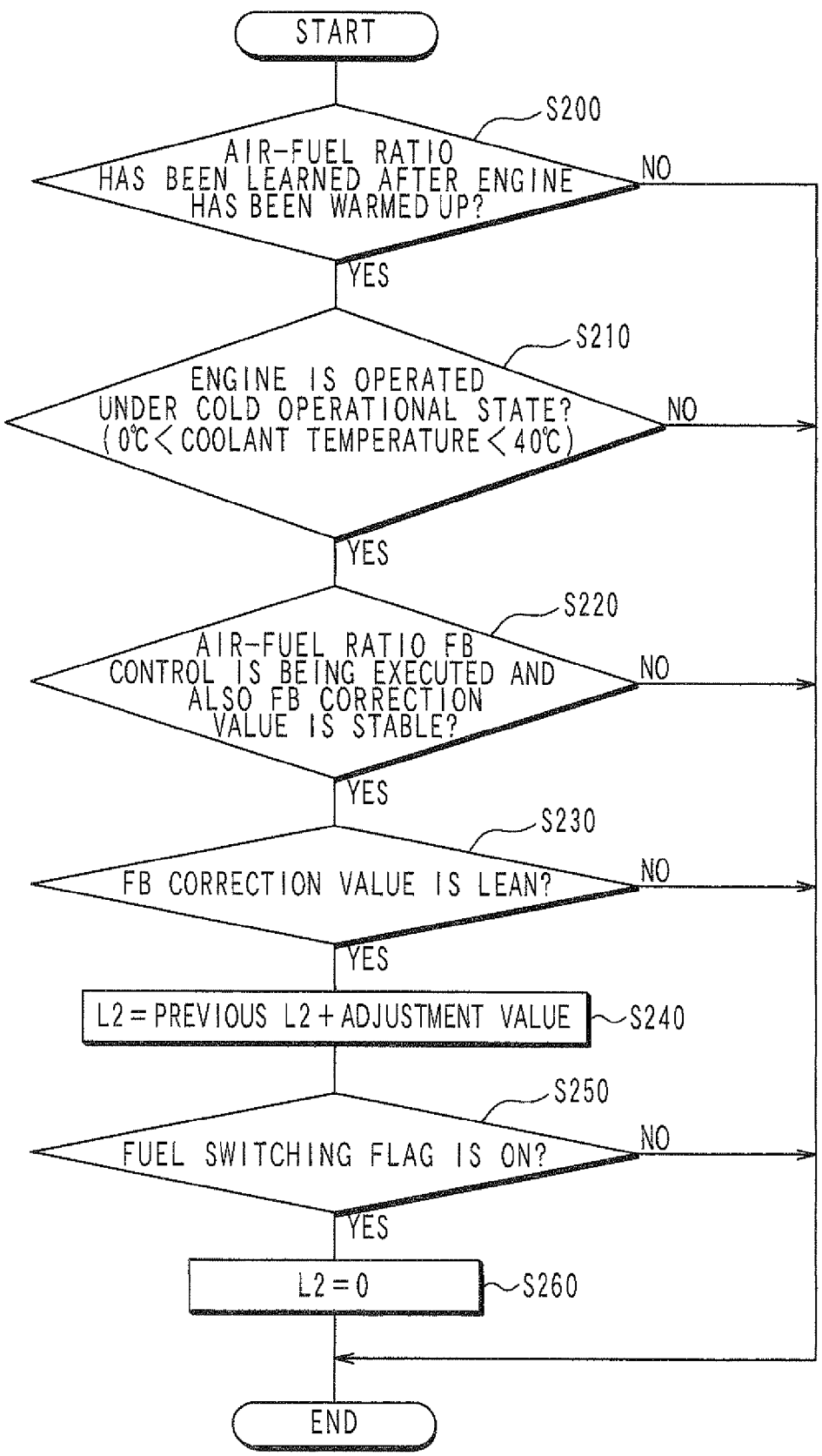
FIG. 6 is a flow chart illustrating a computation method for computing a correction coefficient L2.
Figure 7:
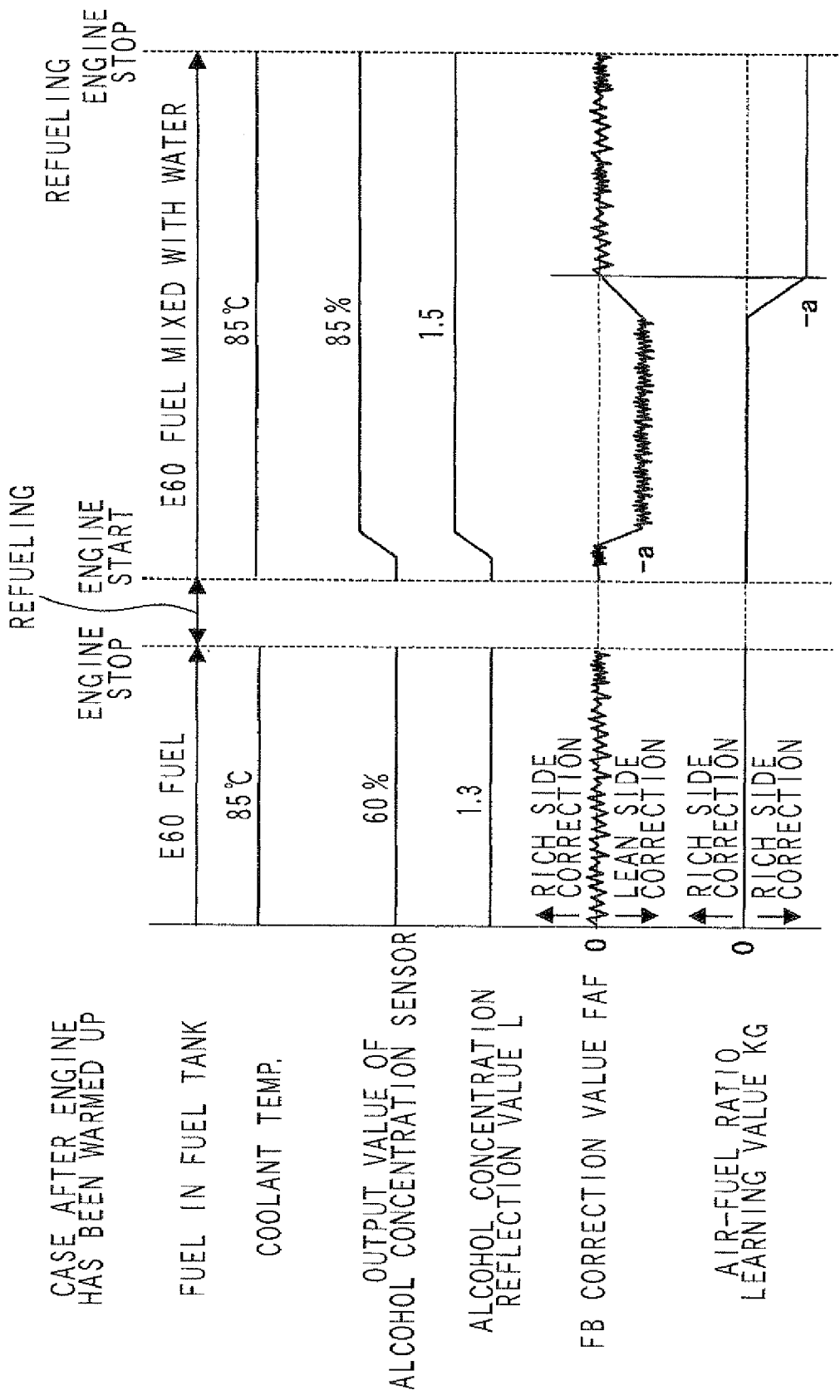
FIG. 7 is a timing chart illustrating behavior of parameters when fuel mixed with water is fed.

A computation method for computing the correction coefficient L2 will be described with reference to a flow chart in FIG. 6 and timing charts in FIGS. 7 and 8. It should be noted that the process in the flow chart in FIG. 6 is executed when the engine 10 is started.

Firstly, at step S200, it is determined whether learning of the air-fuel ratio has been completed during the previous operation of the engine 10 after the warming-up of the engine 10 has been completed. For example, (a) coolant temperature at the time of storing the air-fuel ratio learning value and (b) the elapsed time from the start of the engine 10 to the storing of the learning value are stored. When the stored coolant temperature is equal to or higher than a predetermined temperature (for example, the coolant temperature is equal to or higher than 80° C.), or when the stored elapsed time is equal to or greater than a predetermined time, it is determined that the learning of the air-fuel ratio has been completed, corresponding to YES at S200.

When the learning of the air-fuel ratio has been completed at step S200, control proceeds to step S210, where it is determined based on coolant temperature of the engine 10 whether the engine 10 is operated under a cold operational state before the warming-up of the engine 10 is completed. For example, it is determined at S210 whether 0° C.<coolant temperature<40° C. When it is determined that the engine 10 is operated under the cold state, control proceeds to step S220, where it is determined whether the air-fuel ratio feed-back control is being executed after a predetermined air-fuel ratio feed-back control condition is satisfied, and whether the feed-back correction value FAF is stable. It should be noted that whether the feed-back correction value FAF is stable or not depends on, for example, whether variation range of the feed-back correction value FAF stays within a predetermined range (for example, amplitude) for a predetermined period of time. When it is determined at step S220 that the air-fuel ratio feed-back control is being executed and also the feed-back correction value FAF is stable, corresponding to YES at S220, control proceeds to step S230.

At step S230, it is determined whether the feed-back correction value FAF is leaner than the standard value that corresponds to the theoretical air fuel ratio. For example, when the actual air-fuel ratio is lower than the theoretical air fuel ratio or when the actual air-fuel ratio indicates relatively rich air-fuel mixture compared with the theoretical air fuel ratio, the feed-back correction value FAF indicates a lean value that corresponds to an amount, which is used to reduce the amount of fuel supplied to the engine. When the amount of supplied fuel is corrected by using the lean value of the feed-back correction value FAF, the actual air-fuel ratio is increased to the theoretical air fuel ratio. Thus, at S230 it is determined whether the feed-back correction value FAF indicates the lean value, in other words. When it is determined that the feed-back correction value FAF is leaner than the standard value, corresponding to YES at step S230, control proceeds to step S240, where the correction coefficient L2 is computed. The correction coefficient L2 is computed by adding an adjustment value to the previously computed correction coefficient L2. The adjustment value is computed based on a difference between the feed-back correction value and the standard value that corresponds to the theoretical air fuel ratio. More specifically, when the lean value of the feed-back correction value FAF becomes more widely different from the standard value, the adjustment value is computed such that the adjustment value causes the correction coefficient L2 to further reduce the increase amount of fuel caused by the increase coefficient L1.

It should be noted that when the alcohol concentration reflection value L is reduced in the correction based on the computed correction coefficient L2, a correction amount per unit time for correcting the alcohol concentration reflection value L may have an upper limit such that the alcohol concentration reflection value L is gradually reduced. Thus, it is possible to prevent the sharp change of the amount of fuel supplied to the engine 10.

In the present embodiment, during the cold operational state of the engine 10 before the completion of the warming up, the increase coefficient L1 is computed based on the alcohol concentration detected by the alcohol concentration sensor 25. Also, during the cold operational state of the engine 10, the cold-state increase coefficient K is computed based on the engine temperature that is relatively lower (see FIG. 4). The above computed cold-state increase coefficient K becomes greater as the alcohol concentration becomes higher. In contrast, when the warming-up of the engine 10 is completed, the cold-state increase coefficient K becomes 1 (see FIG. 4), and thereby the injection quantity (injection duration TAU) is corrected to be larger based only on the increase coefficient L1, which is computed based on the detected alcohol concentration.

As above, the injection quantity is corrected and increased based on both the increase coefficient L1 and the cold-state increase coefficient K during the cold operational state of the engine 10. In contrast, the injection quantity is corrected and increased based only on the increase coefficient L1 during the warm operational state of the engine 10. When water has been mixed with blended fuel, the alcohol concentration sensor output value erroneously indicates a value higher than the actual alcohol concentration. Thus, the erroneously-highly detected alcohol concentration is reflected accordingly on the injection quantity when the water is mixed with fuel. As a result, a more excessive amount of fuel tends to be supplied to the engine 10 during the cold operational state compared with an amount of fuel supplied to the engine 10 during the warm operational state after the completion of the warming-up of the engine 10. Thereby, the air-fuel ratio of the air-fuel mixture during the cold operational state tends to be richer erroneously when water is mixed with blended fuel. Accordingly, in order to correct the rich air-fuel ratio, the feed-back correction value FAF computed during the cold operational state of the engine 10 indicates the lean value that is greater than the lean value of the feed-back correction value FAF computed during the warm operational state (after the completion of the warming-up of the engine 10).

In the present embodiment, the air-fuel ratio learning value KG is employed in order to determine whether the feed-back correction value FAF during the cold operational state of the engine 10 is shifted in the leaner side of the standard value that corresponds to the theoretical air-fuel ratio.

As above, the air-fuel ratio learning value KG functions to compensate the difference between the feed-back correction value FAF and the standard value. Even after the completion of the warming up of the engine 10, the injection quantity is corrected and increased based on the increase coefficient L1 that is computed based on the detected alcohol concentration. As a result, the increase correction of the injection quantity using the increase coefficient L1 excessively increases the amount of fuel supplied to the engine 10 when water is mixed with fuel. Thus, as shown in the timing chart of FIG. 7, the feed-back correction value FAF is shifted toward the leaner-side by an amount −a relative to the theoretical air fuel ratio. Accordingly, the air-fuel ratio learning value KG is computed as a certain value (−a) such that the shifted feed-back correction value FAF becomes the standard value that corresponds to the theoretical air fuel ratio. Due to the above computation, the feed-back correction value FAF is brought back to the standard value.

Figure 8:
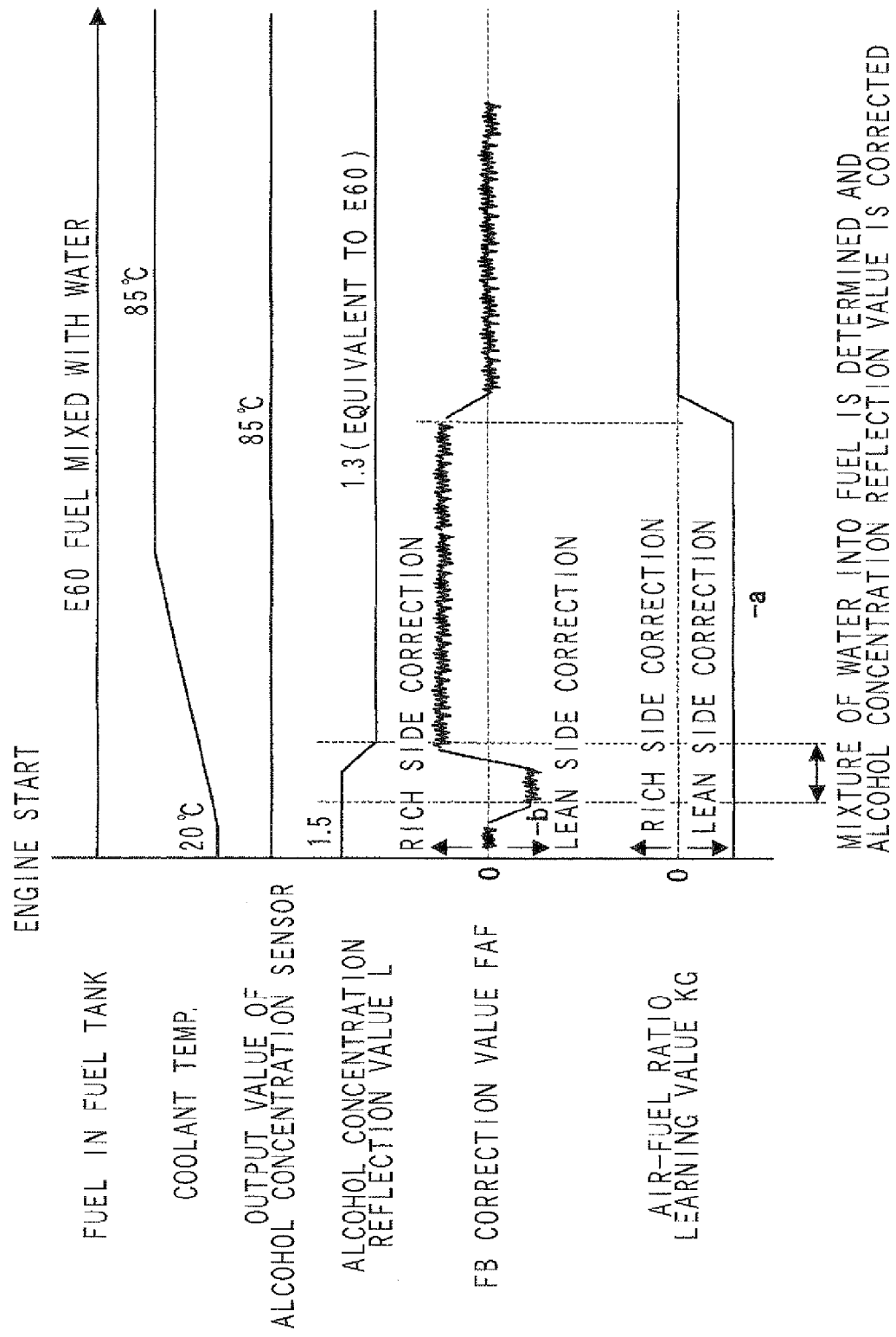
FIG. 8 is timing chart illustrating behavior of parameters when an engine is temporarily stopped and then started after fuel mixed with water is fed.

Then, as shown in FIG. 8, during the cold operational state of the engine 10 in which the engine 10 is started, and also the air-fuel ratio feed-back control has been started, the feed-back correction value FAF corrected based on the air-fuel ratio learning value (−a) may still indicate the lean value that is different from the standard value by an amount of −b. In the above case, it is assumed that the fuel amount has been corrected and further excessively increased based on both the increase coefficient L1 and the cold-state increase coefficient K compared with the fuel amount after the completion of the warming-up of the engine 10.

Thus, in the above case, it is determined that because water is mixed with blended fuel, the feed-back correction value FAF during the cold operational state of the engine 10 indicates the lean value greater than the lean value of the feed-back correction value FAF after the completion of the warming-up of the engine 10. As above, during the cold operational state of the engine 10, two different increase coefficients that changes in accordance with the alcohol concentration sensor output values are employed for the increase correction of the injection quantity. However, after the completion of the warming up of the engine 10, the single increase coefficient is employed for the increase correction of the injection quantity. As a result, the feed-back correction value FAF during the cold operational state of the engine 10 indicates the lean value greater than the lean value of the feed-back correction value FAF after the completion of the warming-up of the engine 10, and thereby, it is possible to detect that water is mixed with the fuel based on the above difference of the feed-back correction value FAF.

As above, the feed-back learning value KG is computed to correct the difference between the feed-back correction value FAF and the standard value. During the warm operational state in a previous operation, the amount of fuel supplied to the engine is corrected based on a first increase correction (increase coefficient L1) that is determined by the detected alcohol concentration. Thus, when water has been mixed with fuel, the amount of fuel supplied to the engine 10 may become excessive because of the correction of the fuel amount computed by the first increase correction based on the erroneously increased output value from the alcohol concentration sensor 25. As a result, the feed-back correction value FAF indicates the lean value that is leaner than the theoretical air fuel ratio, and thereby the feed-back learning value KG is computed to compensate the erroneous lean value of the feed-back correction value FAF. In other words, the feed-back learning value KG is computed to cause the lean value of the feed-back correction value FAF to become the standard value that corresponds to the theoretical air fuel ratio.

During the cold operational state of the engine 10 in a current operation, the feed-back correction value FAF that is corrected by the above-computed feed-back learning value KG in the previous operation may still indicate the lean value. In the above case, it is assumed that the more excessive amount of fuel is supplied to the engine 10 during the current cold operational state compared with the fuel amount supplied during the previous warm operational state. The above is caused because of the correction of the fuel supply amount during the cold operational state, which is corrected based on the first increase correction (increase coefficient L1) and a second increase correction (increase coefficient K). Thus, in the above case, it is determined that water is mixed with fuel, and thereby it is determined that the feed-back correction value FAF during the cold operational state of the engine 10 indicates the lean value greater than the lean value of the feed-back correction value FAF during the warm operational state of the engine 10.

It should be noted that in FIG. 8, the decrease of the alcohol concentration reflection value L corrected based on the correction coefficient L2 temporarily reduces the amount of fuel fed to the engine 10. As a result, the feed-back correction value FAF becomes richer than the standard value that corresponds to the theoretical air fuel ratio such that the decrease of the fuel supply is compensated. Then, when the shift of the feed-back correction value FAF toward the richer side continues for a predetermined time, it is determined to update the air-fuel ratio learning value KG. Thus, the feed-back correction value FAF becomes the standard value from the value that is richer than the standard value. Also, the air-fuel ratio learning value becomes almost zero. The above detection of water mixture with fuel and the correction of the amount of fuel fed to the engine 10 correspond to water mixture correction means.

The flow chart of FIG. 6 will be described again. At step S240, the correction coefficient L2 is computed, and then control proceeds to step S250, where it is determined whether a fuel switching flag is on. The fuel switching flag will be described later, but in short, the fuel switching flag is on when there is a possibility of switching blended fuel in the fuel tank 24 due to the change of fuel amount in the fuel tank 24. When blended fuel is switched (or changed), the alcohol concentration of blended fuel may change. Thus, the above method may not be capable of accurately detecting the contamination of water into blended fuel. Thus, when it is determined at step S250 that the fuel switching flag is on, corresponding to YES at S250, control proceeds to step S260, where the correction coefficient L2 is set as zero, and thereby the correction of the alcohol concentration reflection value L by using the correction coefficient L2 is prevented.

Figure 9:
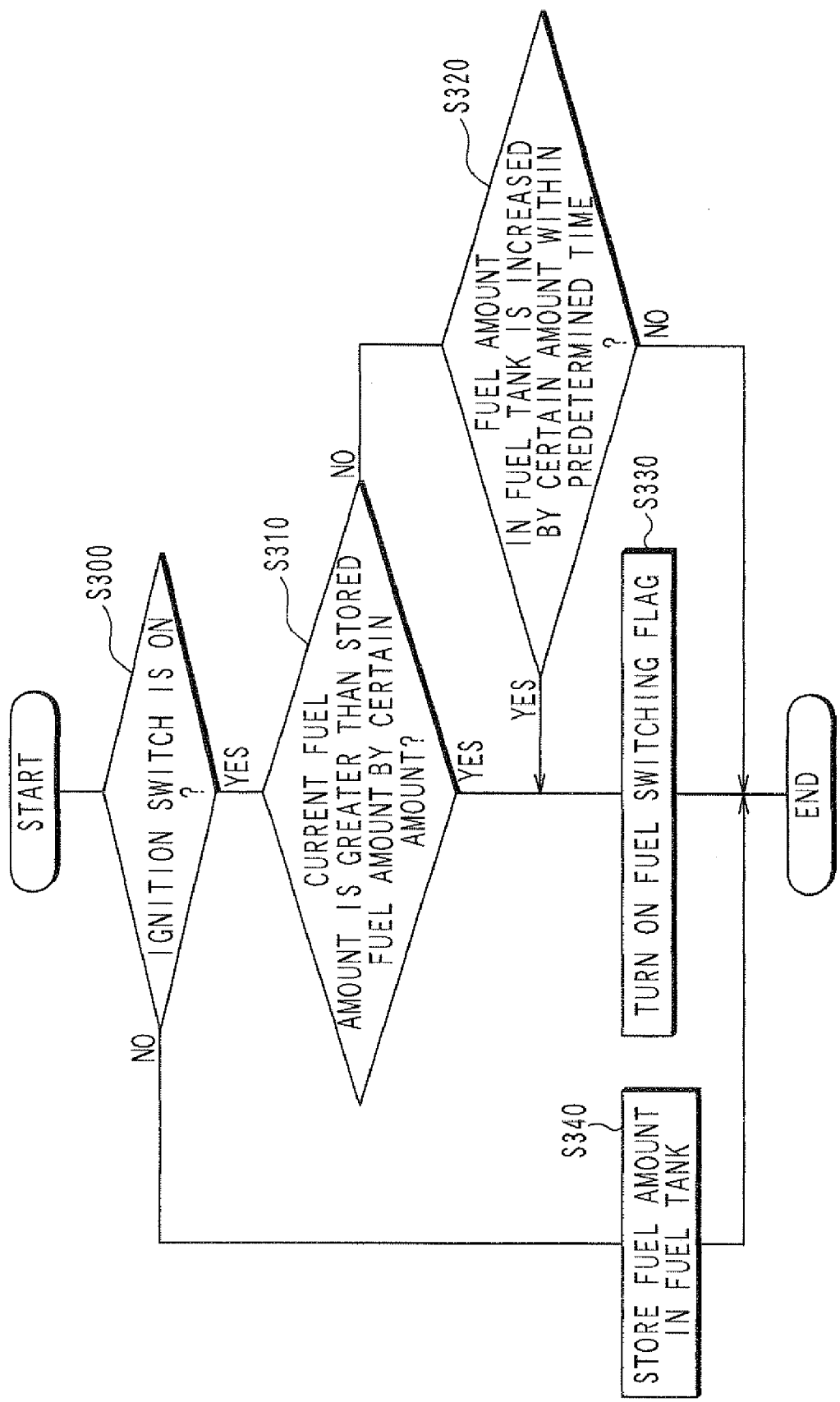
FIG. 9 is a flow chart illustrating a process for determining whether a condition for turning on a fuel switching flag is satisfied.

Next, the fuel switching flag will be described. FIG. 9 is a flow chart illustrating a process for determining whether a condition for turning on the fuel switching flag is satisfied. It should be noted that the process shown in the flow chart of FIG. 9 is repeatedly executed at predetermined time intervals.

Firstly, at step S300, it is determined whether an ignition switch of the vehicle is on or off. When it is determined that the ignition switch is off, corresponding to NO at S300, control proceeds to step S340, where a fuel amount in the fuel tank 24 is stored in the memory.

In contrast, when it is determined at step S300 that the ignition switch is on, corresponding to YES at S300, control proceeds to step S310, where it is determined whether a current fuel amount currently in the fuel tank 24 has become greater than the fuel amount stored in the memory by a certain amount equal to or greater than a predetermined amount. When it is determined that the current fuel amount is greater than the stored fuel amount by the certain amount, corresponding to YES at S310, it is assumed that fuel is fed while the engine stops. Thus, control proceeds to step S330, where the fuel switching flag is turned on.

When it is determined at step S310 that the current fuel amount is not greater than the stored fuel amount by the certain amount, corresponding to NO at S310, control proceeds to step S320. At step S320, it is determined whether the amount of fuel in the fuel tank 24 is increased by an amount equal to or greater than another predetermined amount within a predetermined time. In order to reliably determine that the fuel has been switched due to the supply of fuel while the ignition switch is on, the above determination process is executed. As a result, when it is determined at step S320 that the amount of fuel in the fuel tank 24 is increased by the amount, corresponding to YES at S320, control proceeds to step S330, where the fuel switching flag is turned on.

Next, the process for determining whether a condition for turning off the fuel switching flag is satisfied will be described with reference to a flow chart of FIG. 10. It should be noted that the process shown in the flow chart of FIG. 10 is repeatedly executed at predetermined time intervals.

Firstly, it is determined at step S400 whether the fuel switching flag is on. When it is determined that the fuel switching flag is off, corresponding to NO at S400, control proceeds to step S450, where a fuel injection integrated quantity is reset to be zero. It should be noted that the fuel injection integrated quantity corresponds to an integrated value of an amount of fuel that has been supplied to the engine 10 through the injector 19 since a time of turning on the fuel switching flag.

When it is determined at step S400 that the fuel switching flag is on, corresponding to YES as S400, control proceeds to step S410, where a fuel injection quantity that has been supplied through the injector 19 is computed. Then, the above computed fuel injection quantity is added to the previous fuel injection integrated quantity in order to compute a current fuel injection integrated quantity.

Then, control proceeds to step S420, where it is determined whether the current fuel injection integrated quantity computed at step S410 is equal to or greater than a predetermined value. The predetermined value is set to correspond to an amount of fuel stored in the fuel passage 23 between a position of the alcohol concentration sensor 25 to a position of the injector 19. When blended fuel having an alcohol concentration different from the concentration of the blended fuel in the fuel tank 24 is fed, the alcohol concentration detected by the alcohol concentration sensor 25 changes. However, the fuel having the detected alcohol concentration will not be supplied to the engine 10 until all of the fuel in the above fuel passage 23 has been injected. Thus, when it is determined that the fuel injection integrated quantity is less than the predetermined value, it is assumed that the fuel has not been completely switched, and thereby the process shown in FIG. 10 is ended without executing an additional step.

In contrast, when it is determined at step S420 that the fuel injection integrated quantity is equal to or greater than the predetermined value, control proceeds to step S430, where it is determined whether the alcohol concentration detected by the alcohol concentration sensor 25 is stable. Specifically, when the detected alcohol concentration changes within a predetermined range (amplitude) for a predetermined period of time, it is determined that the alcohol concentration is stable. In the above case, it is assumed that the fuel has been successfully switched (the switching of the fuel has been completed), and thereby control proceeds to step S440, where the fuel switching flag is turned off.

As above, the embodiment of the present invention has been described. However, the present invention is not limited to the above embodiment, and thereby it is possible to modify the present invention in various manner provided that the modification is not deviating from a gist of the present invention.

Additional advantages and modifications will readily occur to those skilled in the art. The invention in its broader terms is therefore not limited to the specific details, representative apparatus, and illustrative examples shown and described.

What is claimed is:

1. A fuel supply control apparatus for an engine that is capable of using alcohol, gasoline and alcohol-gasoline mixture as fuel, the fuel supply control apparatus comprising:
an alcohol concentration detector adapted to detect alcohol concentration of fuel
an engine temperature detector adapted to detect engine temperature;
first increase correction means for correcting an amount of fuel supplied to the engine such that the amount of fuel is increased as the detected alcohol concentration becomes higher;
second increase correction means for correcting the amount of fuel supplied to the engine such that the amount of fuel is increased as the detected engine temperature becomes lower and also as the detected alcohol concentration becomes higher;

air-fuel ratio feed-back correction means for feed-back correcting the amount of fuel supplied to the engine by using a feed-back correction value such that an actual air-fuel ratio of the engine becomes closer to a theoretical air fuel ratio, when the actual air-fuel ratio is lower than the theoretical air fuel ratio, the feed-back correction value indicating a lean value that corresponds to an amount, which is used to reduce the amount of fuel supplied to the engine such that the actual air-fuel ratio is increased to the theoretical air fuel ratio; and water mixture correction means for determining that water is mixed with fuel when the feed-back correction value used during a cold operational state of the engine indicates the lean value greater than the lean value of the feed-back correction value used during a warm operational state of the engine, wherein:

the water mixture correction means reduces the increased amount of fuel, which is increased based on the detected alcohol concentration, when the water mixture correction means determines that water is mixed with fuel.

2. The fuel supply control apparatus according to claim 1, further comprising:

air-fuel ratio feed-back learning means for computing a feed-back learning value when the feed-back correction value is different by a certain amount from a standard value that corresponds to the theoretical air fuel ratio, the feed-back learning value being used for correcting the certain amount, the air-fuel ratio feed-back learning means correcting the air-fuel ratio feed-back correction value by using the feed-back learning value;

the water mixture correction means determines that water is mixed with fuel when the feed-back correction value that is corrected during the cold operational state of the engine based on the feed-back learning value, which is computed in the warm operational state of the engine, indicates the lean value; and the water mixture correction means reduces the increased amount of fuel when the water mixture correction means determines that water is mixed with fuel.

3. The fuel supply control apparatus according to claim 1, wherein:

the water mixture correction means further reduces the increased amount of fuel as the lean value of the feed-back correction value during the cold operational state becomes greater.

4. The fuel supply control apparatus according to claim 3, wherein:

the water mixture correction means reduces the increased amount of fuel by a correction amount that has an upper-limit per unit time such that the increased amount of fuel gradually becomes smaller.

5. The fuel supply control apparatus according to claim 1, further comprising:

fuel switch determination means for determining whether fuel in fuel tank during the warm operational state of the engine is changed from fuel in fuel tank during the cold operational state; and the water mixture correction means is limited from correcting the increased amount of fuel when the fuel switch determination means determines that fuel during the warm operational state is changed from fuel during the cold operational state.

6. The fuel supply control apparatus according to claim 1, wherein:

the second increase correction means corrects the amount of fuel supplied to the engine when the engine is operated under the cold operational state; and the water mixture correction means determines that water is mixed with fuel when the feed-back correction value used during the cold operational state in a current operation of the engine indicates the lean value greater than the lean value of the feed-back correction value used during the warm operational state in a previous operation of the engine.

\* \* \* \* \*